Figure 1:
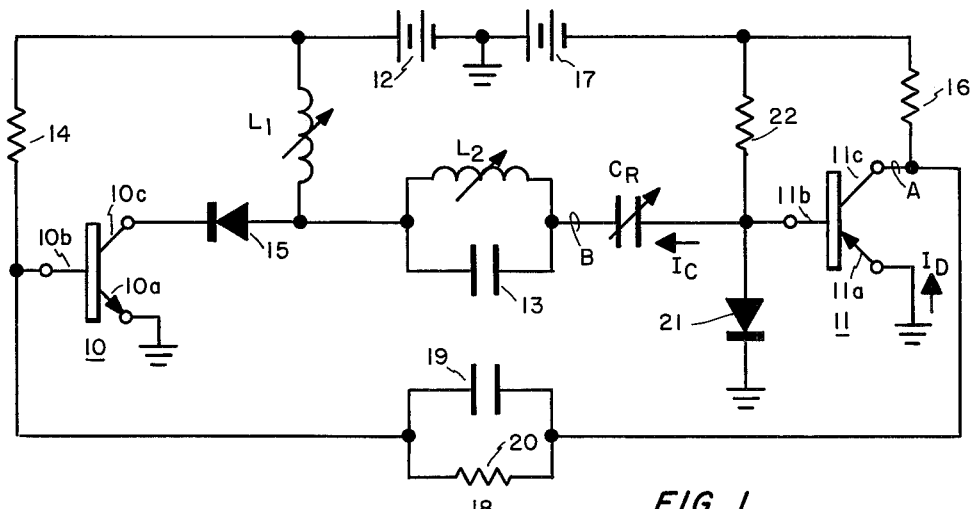

Nov. 16, 1965         M. FISCHMAN         3,218,577
RESONANT CIRCUIT CONTROLLED ASYMMETRICAL PULSE GENERATOR
Filed Dec. 26, 1962

INVENTOR.
MARTIN FISCHMAN
BY R. J. Frank
ATTORNEY

United States Patent Office 3,218,577
Patented Nov. 16, 1965

3,218,577
RESONANT CIRCUIT CONTROLLED ASYM-METRICAL PULSE GENERATOR
Martin Fischman, Wantagh, N.Y., assignor to General Telephone and Electronics Laboratories, Inc., a corporation of Delaware
Filed Dec. 26, 1962, Ser. No. 247,061
5 Claims. (Cl. 331—117)

This invention relates to pulse generators and in particular to a generator for producing a continuous asymmetrical output voltage.

Pulse generators which produce output voltages having first and second constant magnitudes with abrupt transitions from one magnitude to the other are well known. For example, a sine wave oscillator utilizing a resonant circuit followed by a limited stage will produce highly stable symmetrical output voltage pulses in which the intervals between successive voltage transitions are equal. Pulse generators producing asymmetrical output voltages are also well known, but these generally utilize resistance-capacitance networks to determine the intervals between transitions and are therefore less stable than generators employing resonant circuits.

Accordingly, it is an object of my invention to provide a highly stable pulse generator which produces a continuous asymmetrical output voltage.

It is another object of the invention to provide a pulse generator in which the intervals between successive transitions of the output voltage pulses from one magnitude to another are precisely controlled and are of different durations.

Still another object is to provide a pulse generator having a continuous asymmetrical output voltage in which the intervals between successive transitions of the output voltage pulses may be of widely different durations.

Yet another object is to provide a pulse generator in which the transitions in the output voltage pulses are effected with a minimum loss of energy.

In the present invention, a pulse generator is provided which produces a continuous output voltage having first and second intervals of constant magnitude with abrupt transitions from one magnitude to the other, the durations of the first and second intervals being unequal. The durations of these intervals are precisely controlled by a resonant circuit having first and second resonant periods. The duration of each interval is equal to one-half the first and second resonant periods respectively. Switching from one resonant state to the other is achieved by changing the magnitude of the inductance in series with a capacitor each time the current through the resonant circuit goes through zero. It is at this time that almost all of the energy is stored in the capacitor and therefore switching losses are minimized.

In one embodiment of the invention, the resonating elements of the pulse generator comprise a capacitor and first and second inductors. First and second transistors of opposite conductivity types, each having first, second, and third electrodes, are connected to the resonating elements. The first electrode of the first, or switching, transistor is connected to a common ground point and the second and third electrodes of the first transistor are coupled across the first inductor. The first electrode of the second transistor is connected to the common ground point, the second electrode is connected to the capacitor, and the third electrode is coupled by means of a feedback network to the second electrode of the first transistor. A diode is connected between the first and second electrodes of the second transistor. In one method of connecting the transistors the first, second, and third electrodes are the emitter, base, and collector electrodes respectively.

During the first part of the cycle, both transistors are cut off and during the remainder of the cycle both transistors are conducting. When both transistors are cut off, current flows through the capacitor, both inductors and the diode. This current varies sinusoidally at a first resonant frequency determined by the values of the capacitor and the two inductors. Due to the conduction of the diode, the base of the second transistor is held at essentially emitter potential thereby maintaining it in a non-conducting state. When the current goes through zero, however, the second transistor begins conducting and drives the first transistor into conduction through the feedback network. Since the low impedance of the first transistor is coupled across the first inductor, the first inductor is effectively short circuited. Consequently, current now flows through the capacitor, the second inductor and the two transistors with a frequency determined by the capacitor and second inductor. Thus, during the portion of the cycle when the transistors are non-conducting, the duration of the output pulse is determined by the resonant frequency of the capacitor and both inductors; during the portion of the cycle when the transistors are conducting the duration of the output pulse is determined by the resonant frequency of the capacitor and the second inductor. Switching from one state to the other is controlled by the resonant current and occurs at the instant that the current goes through zero.

Figure 2:
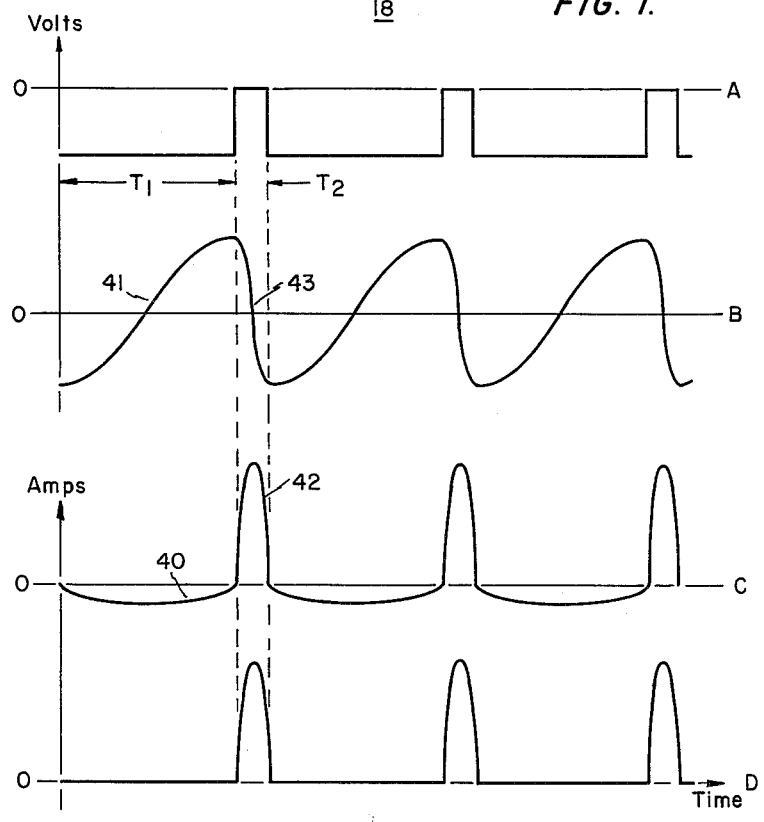

The above objects of and the brief introduction to the present invention will be more fully understood and further objects and advantages will become apparent from a study of the following description in connection with the drawings, wherein:

FIG. 1 is a schematic diagram of my invention, and
FIG. 2 depicts idealized voltage and current waveforms useful in explaining the operation of the circuit of FIG. 1.

As shown in FIG. 1, the pulse generator comprises a type NPN transistor 10 having emitter, base, and collector electrodes 10a, 10b, and 10c, respectively and a type PNP transistor 11 having emitter, base, and collector electrodes 11a, 11b, and 11c respectively. A series resonant circuit consisting of inductors $L_1$ and $L_2$ and a capacitor $C_R$ is connected between the positive terminal of a voltage source 12 and the base 11b of transistor 11. A bypass capacitor 13 is connected across inductor $L_2$. The base 10b of transistor 10 is coupled through a resistor 14 to the junction of inductor $L_1$ and the positive terminal of voltage source 12. The collector 10c of transistor 10 is coupled through a diode 15 to the junction of inductors $L_1$ and $L_2$. The collector 11c of transistor 11 is coupled through a resistor 16 to the negative terminal of a voltage source 17 and through a feedback network 18 consisting of a capacitor 19 and a resistor 20 to the base of transistor 10. One terminal of a diode 21 is connected to the base of transistor 11 and the other to the grounded emitters of transistors 10 and 11, the negative terminal of voltage source 12 and the positive terminal of voltage source 17.

The operation of the circuit may be best understood by assuming that it has been oscillating for some time and that at time $t=0$ transistors 10 and 11 are non-conducting. At this time, the base of transistor 10 is negative with respect to ground and the collector of transistor 11 (point A) has a value somewhat more positive than the negative terminal of voltage source 17. The voltages on the base of transistor 10 and the collector of transistor 11 are determined by the voltage divider consisting of resistors 14, 18, and 16 connected across voltage sources 12 and 17. The voltage between point A and ground is shown in FIG. 2A and similarly, the voltage at point B and the currents $I_C$ and $I_D$ are shown in FIGS. 2B, 2C and 2D respectively.

With both transistors cut off, a sinusoidal current 40 (FIG. 2C) flows from voltage source 12 through inductors $L_1$ and $L_2$, capacitor $C_R$, and diode 21 back to source 12. This current produces a cosinusoidal voltage 41 at point B and has a duration $T_1$ which is determined by the value of capacitor $C_R$ and the sum of the values of inductors $L_1$ and $L_2$. Transistor 11 remains cut off because its base is held at substantially emitter potential by the voltage drop across diode 21, diode 21 being poled to conduct only from the base of transistor 11 to ground. During the first portion of the interval $T_1$, the voltage at the junction of inductors $L_1$ and $L_2$ swings negative by an amount which is much greater than the negative voltage at the base of transistor 10. Accordingly, diode 15 is provided to prevent current flow from the base to collector of transistor 10 during this portion of the cycle.

When the resonant current $I_C$ becomes zero at time $T_1$, transistor 11 begins conducting. The collector voltage (point A) rises to zero and drives the base of transistor 10 positive causing it to start conducting. As a result, the resonant current $I_C$ now flows through transistor 10 instead of inductor $L_1$ (in the direction of the arrow) for an interval $T_2$ determined by capacitor $C_R$ and inductor $L_2$. Current $I_C$ flows through the emitter-base path of transistor 11 as shown in FIG. 2D since diode 21 is non-conducting. The magnitude of the resonant current is determined by the ratio of $T_2$ and $T_1$ and the fact that the average current in the resonant circuit over a complete cycle $T_1+T_2$ must be zero. The voltage at point B is cosinusoidal over the period $T_2$ as shown at 43 in FIG. 2B.

At time $T_1+T_2$, all of the energy is stored in the capacitor and resonant current $I_C$ becomes zero. This drives transistor 11 out of conduction, causes its collector voltage to drop thereby cutting off transistor 10. With transistor 10 cut off, current flows through indicator $L_1$ for a period determined by the capacitor and both inductors.

The durations of periods $T_1$ and $T_2$ are precisely and stably determined by the zero intercepts of the resonant current $I_C$ which causes transistor 10 to effectively switch inductor $L_1$ in or out of the circuit at a time when practically all of the energy is in the capacitor. Thus, little energy is lost in the switching and transients due to switching losses are minimized.

Bypass capacitor 13 provides a low impedance path around inductor $L_2$ during the switching portions of the cycle and provides a rectangular output wave at point A having extremely steep leading and trailing edges. A starting resistor 22 connected between the negative terminal of voltage source 17 and the base of transistor 11 furnishes the current required to start oscillations in the circuit. Feedback network 18 provides a regenerative feedback path from high frequencies down to D.C. due to the direct coupling through resistor 20. Capacitor 19 provides increased speed of response of transistor 10 to the leading and trailing edges of the output pulse.

In a typical circuit, the types and values of the components are as follows:

Transistor 10 _____ Type 2N1409.
Transistor 11 _____ Type 2N428.
Inductor $L_1$ _____ 15 millihenries.
Inductor $L_2$ _____ 0.5 millihenries.
Capacitor $C_R$ _____ 4700 picofarads.
Voltage source 12 _____ 10 volts.
Capacitor 13 _____ 220 picofarads.
Resistor 14 _____ 1200 ohms.
Diode 15 _____ Type 1N279.
Resistor 16 _____ 100 ohms.
Voltage source 17 _____ 10 volts.
Capacitor 19 _____ 560 picofarads.
Resistor 20 _____ 560 ohms.
Diode 21 _____ Type 1N279.
Resistor 22 _____ 180,000 ohms.

The pulse duration $T_1$ is approximately equal to $\pi\sqrt{C_R(L_1+L_2)}=27$ microseconds and the duration $T_2$ is approximately equal to $\pi\sqrt{C_R L_2}=4.8$ microseconds. The ratio of $T_1$ to $T_2$ may be varied between 3 and 30 by adjustment of inductors $L_1$ and $L_2$. With this circuit, the change in pulse duration is approximately 0.1% with a 10% change in supply voltage. The rise and decay times of the output pulse at point A are 0.1 microsecond.

As many changes could be made in the above construction and many different embodiments could be made without departing from the scope thereof it is intended that all matter contained in the above description or shown in the accompanying drawings shall be interpreted as illustrative and not in a limiting sense.

What is claimed is:
1. A pulse generator for producing an asymmetrical output voltage comprised of first and second periods of different durations comprising
   (a) first and second transistors of opposite conductivity types each having first, second, and third electrodes, the first electrodes of said first and second transistors being coupled together,
   (b) a first inductor coupled between the second and third electrodes of said first transistor,
   (c) a second inductor and a capacitor coupled between the third electrode of said first transistor and the second electrode of said second transistor,
   (d) an asymmetrically conducting device coupled between the first and second electrodes of said second transistor, current flow through said device being in the opposite direction with respect to said first and second electrodes from the direction of current flow through said second transistor, and
   (e) feedback means coupled between the third electrode of said second transistor and the second electrode of said first transistor, the voltage between said first and third electrodes of said transistor having a first period determined by the values of said capacitor and said first and second inductors and a second period determined by the values of said capacitor and said second inductor.

2. A pulse generator for producing an asymmetrical output voltage comprised of first and second periods of different durations comprising
   (a) first and second transistors of opposite conductivity types each having emitter, base, and collector electrodes, the emitter electrodes of said first and second transistors being coupled together,
   (b) a first inductor coupled between the base and collector electrodes of said first transistor,
   (c) a second inductor and a first capacitor coupled between the collector electrode of said first transistor and the base electrode of said second transistor,
   (d) a diode coupled between the base and emitter electrodes of said second transistor, said diode being poled in relation to the base and emitter electrodes of said second transistor so as to conduct current during the period when said second transistor is non-conducting, and
   (e) feedback means coupled between the collector electrode of said second transistor and the base electrode of said first transistor, said feedback means including a parallel connected resistor and second capacitor, the voltage between the collector and emitter electrodes of said second transistor having a first period determined by the value of said first capacitor and said first and second inductors and a second period determined by the values of said first capacitor and said second inductor.

3. A pulse generator for producing an asymmetrical output voltage comprised of first and second periods of different durations comprising (a) first and second transistors of opposite conductivity types each having emitter, base, and collector electrodes, the emitter electrodes of said first and second transistors being coupled together,
(b) a series resonant circuit including first and second inductors and a capacitor coupled between the base electrode of said second transistor and a voltage source,
(c) a first diode coupled to the collector electrode of said first transistor and to one end of said first inductor,
(d) means coupling the other end of said first inductor to the base of said first transistor,
(e) a second diode coupled between the base and emitter electrodes of said second transistor, and
(f) feedback means coupled between the collector electrode of said second transistor and the base electrode of said first transistor, the voltage between the collector and emitter electrodes of said second transistor having a first period determined by the value of said first capacitor and said first and second inductors and a second period determined by the values of said first capacitor and said second inductor.

4. A pulse generator for producing an asymmetrical output voltage comprised of first and second periods of different durations comprising
(a) first and second transistors of opposite conductivity types each having emitter, base, and collector electrodes, the emitter electrodes of said first and second transistors being coupled together,
(b) a first diode having one end connected to the collector electrode of said first transistor,
(c) a first inductor coupled between the other end of said first diode and a first terminal of a voltage source,
(d) a series-connected resonant circuit including a capacitor and a second inductor, said capacitor being coupled to the base of said second transistor and said second inductor being coupled to the junction of said first inductor and said first diode,
(e) a second diode coupled between the base and emitter electrodes of said second transistor,
(f) feedback means coupled between the collector electrode of said second transistor and the base electrode of said first transistor,
(g) impedance means coupling the base of said first transistor to the first terminal of said voltage source, and
(h) impedance means coupling the collector of said second transistor to a second terminal of said voltage source.

5. A pulse generator as defined by claim 4 wherein a bypass capacitor is coupled across said second inductor and a starting resistor is coupled between the base of said second transistor and the second terminal of said voltage source.

References Cited by the Examiner
UNITED STATES PATENTS
2,743,392   4/1956   Friend _____ 331—167 X ROY LAKE, *Primary Examiner.*
JOHN KOMINSKI, *Examiner.*